United States Patent
Faragher et al.

(10) Patent No.: US 11,815,355 B2
(45) Date of Patent: *Nov. 14, 2023

(54) METHOD AND SYSTEM FOR COMBINING SENSOR DATA

(71) Applicant: Focal Point Positioning Limited

(72) Inventors: Ramsey Faragher, Cambridge (GB); Mark Crockett, Hertfordshire (GB); Peter Duffett-Smith, Huntingdon (GB)

(73) Assignee: Focal Point Positioning Limited, Cambridge (GB)

( * ) Notice: Subject to any disclaimer, the term of this patent is extended or adjusted under 35 U.S.C. 154(b) by 34 days.

This patent is subject to a terminal disclaimer.

(21) Appl. No.: 17/315,461

(22) Filed: May 10, 2021

(65) Prior Publication Data

US 2021/0278216 A1    Sep. 9, 2021

Related U.S. Application Data

(63) Continuation of application No. 15/894,841, filed on Feb. 12, 2018, now Pat. No. 11,035,673.

(30) Foreign Application Priority Data

Oct. 26, 2017    (GB) ..................... 1717632

(51) Int. Cl.
*G01C 21/00*    (2006.01)
*G01S 19/48*    (2010.01)
(Continued)

(52) U.S. Cl.
CPC ....... *G01C 21/005* (2013.01); *G01C 21/1652* (2020.08); *G01C 21/1654* (2020.08);
(Continued)

(58) Field of Classification Search
CPC ...... G01C 21/005; G01C 21/12; G01C 21/16; G01C 21/165; G01C 22/006; G01S 19/48; G01S 19/49; G01S 5/017; G01S 5/018
(Continued)

(56) References Cited

U.S. PATENT DOCUMENTS 9,780,829 B1    10/2017    Faragher et al.
10,321,430 B2    6/2019    Faragher et al.
(Continued)

FOREIGN PATENT DOCUMENTS

EP    3211371 A1    8/2017
WO    2017033141 A1    3/2017

OTHER PUBLICATIONS

He et al., "Probabilistic multi-sensor fusion based indoor positioning system on a mobile device." Sensors 15.12 (2015): 31464-31481.
(Continued)

*Primary Examiner* — John H Le
(74) *Attorney, Agent, or Firm* — Moser Taboada

(57) ABSTRACT

A method and system for combining data obtained by sensors, having particular application in the field of navigation systems, are disclosed. The techniques provide significant improvement over state-of-the-art Markovian methods that use statistical noise filters such as Kalman filters to filter data by comparing instantaneous data with the corresponding instantaneous estimates from a model. In contrast, the techniques disclosed herein use multiple time periods of various lengths to process multiple sensor data streams, in order to combine sensor measurements with motion models at a given time epoch with greater confidence and accuracy than is possible with traditional "single epoch" methods. The techniques provide particular benefit when the first and/or
(Continued)

second sensors are low-cost sensors (for example as seen in smart phones) which are typically of low quality and have large inherent biases.

20 Claims, 6 Drawing Sheets

(51) Int. Cl.
    *G01C 22/00*     (2006.01)
    *G01C 21/06*     (2006.01)
    *G01C 21/16*     (2006.01)

(52) U.S. Cl.
    CPC ....... *G01C 21/1656* (2020.08); *G01C 21/185* (2020.08); *G01C 21/188* (2020.08); *G01C 22/006* (2013.01); *G01S 19/48* (2013.01); *G01S 19/485* (2020.05)

(58) Field of Classification Search
    USPC ......................................................... 702/150
    See application file for complete search history.

(56) References Cited

U.S. PATENT DOCUMENTS

| | | | |
|---|---|---|---|
| 10,816,672 | B2 | 10/2020 | Faragher et al. |
| 11,035,673 | B2 * | 6/2021 | Faragher ................ G01C 21/16 |
| 2008/0214360 | A1 | 9/2008 | Stirling et al. |
| 2011/0238308 | A1 | 9/2011 | Miller |
| 2014/0228649 | A1 | 8/2014 | Rayner et al. |
| 2015/0185045 | A1 | 7/2015 | Crawford et al. |
| 2016/0252354 | A1 | 9/2016 | Georgy et al. |
| 2018/0216934 | A1 | 8/2018 | Morchon et al. |
| 2019/0049566 | A1 | 2/2019 | Adams et al. |
| 2019/0086553 | A1 | 3/2019 | Faragher et al. |
| 2020/0264317 | A1 | 8/2020 | Faragher et al. |
| 2020/0319347 | A1 | 10/2020 | Faragher et al. |

OTHER PUBLICATIONS

International Search Report and Written Opinion in International Patent Application No. PCT/GB2018/053105 dated Jan. 25, 2019, 19 pages.

\* cited by examiner

METHOD AND SYSTEM FOR COMBINING SENSOR DATA

CROSS-REFERENCE TO RELATED APPLICATION(S)

The present application is a continuation of U.S. application Ser. No. 15/894,841, filed on Feb. 12, 2018, which in turn claims priority to United Kingdom Application No. 1717632.2, filed Oct. 26, 2017. Each of these applications is incorporated herein by reference in its entirety.

FIELD OF THE INVENTION

The present invention is directed to a method and system for combining data obtained by sensors, and has particular application in the field of navigation systems.

BACKGROUND

A traditional inertial navigation system uses standard mechanics equations to convert measurements from inertial measurement units (for example accelerometers, gyroscopes etc.) into navigation data, such as velocity, orientation and position. A known problem with such a system is that of numerical integration error, which manifests as rapidly increasing errors in the derived navigation data. The inertial navigation equations typically involve the determination of orientation, velocity and position through numerical integration of successive rotation-rate and acceleration measurements. The integration of measurement errors (for example, due to sensor noise, biases, scale-factor and alignment errors) results in an ever increasing velocity error, which in turn is accumulated into an even more rapidly-increasing position error. The effects of numerical integration error are particularly pronounced in the case of low-cost inertial measurement units (IMUs), the sensors of which are relatively noisy, possess large alignment and scale-factor errors, and have biases which may drift significantly over time or with changes in temperature.

The availability of low-cost IMUs is becoming more widespread and, as such, navigation systems are becoming more commonplace, for example in smart devices such as smart phones and fitness trackers. However, these low cost IMUs are generally of relatively low quality which means that the error drift is typically substantial, providing spurious and unhelpful results to a user. Global Navigation Satellite System (GNSS) receivers (such as GPS and GLONASS) may be used in combination with IMUs in order to help improve the accuracy of the navigation solution. However, GNSS coverage is not always readily available (for example inside buildings) and GNSS units themselves may provide inaccurate navigation data in certain situations, for example in "urban canyons".

Furthermore, smart devices such as smart phones may be carried in a variety of different positions and orientations with respect to the user, who may frequently change his or her manner of motion. For example, a smart phone user may start a journey by walking with the smart phone positioned in a pocket. On receipt of a call, the phone may be moved to the user's ear, during which time the user has to run for a bus, after which the user spends the remainder of the journey travelling by bus. Such changes in motion of the user and relative position and orientation of the device with respect to the user can introduce further error into the final navigation solution in comparison to, for example, traditional strap-down systems where inertial measurement units are provided in fixed positions and orientations with respect to their host platform.

Nevertheless, a user of such a navigation system using low cost IMUs will still demand accurate and reliable positioning information, and there is therefore a requirement in the art to solve the problems outlined above.

SUMMARY

In accordance with a first aspect of the techniques introduced herein there is provided a method of combining data from at least one sensor configured to make measurements from which position or movement may be determined, in order to determine the evolution of a metric of interest over time, comprising: obtaining, in a first time period, first data from a first sensor mounted on a first platform; obtaining, in a second time period, second data from said first sensor and/or a second sensor mounted on the first platform or a second platform; determining the evolution of a metric of interest between first and second time instances, wherein at least one of the first and second time instances is within at least one of the first and second time periods, and; wherein the evolution of the metric of interest is constrained by at least one of the first data, second data and a motion model of the first and/or second platform.

The problems outlined above in the introduction section can be overcome by the method of the techniques introduced herein. The techniques provide a significant improvement over state-of-the-art Markovian methods that use statistical noise filters such as Kalman filters to filter data by comparing instantaneous data with the corresponding instantaneous estimates from a model. In contrast, the techniques introduced herein use multiple time periods (or time "windows") of various lengths to process multiple sensor data streams, in order to combine (or "fuse") sensor measurements with motion models at a given time epoch with greater confidence and accuracy than is possible with traditional "single epoch" methods. The method finds particular benefit when the first and/or second sensors are low-cost sensors (for example as seen in smart phones) which are typically of low quality and have large inherent biases.

Here, the term "evolution" is used to mean the change in the value of the metric of interest over time. For example, the metric of interest could be a position of a device, and thus the evolution of the position of the device over time could be determined, providing an accurate profile of a journey taken by the device. In general, the metric of interest could comprise any metric that may be determined from a sensor configured to make measurements from which position or movement may be determined. Examples of such metrics include a position, a range, a speed, a velocity, a trajectory, an altitude, an attitude (orientation), a compass heading, a stepping cadence, a step length, a distance travelled, a motion context, a position context, an output power, a calorie count, a sensor bias, a sensor scale factor, and a sensor alignment error. Other metrics might be included in this list as would be evident to one skilled in the art.

The at least one sensor is configured to make measurements from which position or movement can be determined. The sensor may measure position or movement directly, for example a GNSS sensor where the measurement value is a position or movement value, or indirectly, for example a light sensor from which the sensor's position may be inferred, for example that it is within an enclosed space such as a bag.

The first and second data are obtained in first and second time periods, and the evolution of the metric of interest is determined between first and second time instances, wherein at least one of the first and second time instances is within at least one of the first and second time periods. Here, a "time period" is the period of time that elapses between two spaced apart time instances, which may or may not be the first and second time instances. In some examples the first and second time instances may define the first time period.

In a preferred embodiment, the method further comprises analysing the first and/or second data over at least a part of the respective first and/or second time period in order to assess the reliability and/or accuracy of the first and/or second data. Furthermore, the method may comprise analysing the first and/or second data over at least a part of the respective first and/or second time period in order to obtain corrected first data and/or corrected second data, and further wherein; the evolution of the metric of interest is constrained by at least one of the corrected first data, corrected second data and a motion model of the first and/or second platform. Typically, said corrected first data and/or corrected second data are more accurate and/or reliable than the respective first and/or second data. The corrected first and/or second data may be obtained by correcting at least one error in the obtained first and/or second data.

Such analyses of the first and second data provide further advantages over state-of-the-art methods which do not perform such analyses before processing the obtained data and providing their metric of interest solution. The techniques introduced herein beneficially allow data which are more reliable and/or accurate to be used in the determination of the metric of interest, therefore providing a more accurate and reliable solution to a user.

The analysing the first and/or second data may comprise performing self-consistency checks, which may for example comprise analysing the data from a given sensor across its corresponding time period. Typically this may include analysing the data to ensure that it does not violate the accepted laws of Physics. For example, the first and/or second data may be obtained from a GNSS sensor and show a positioning trace that is smooth with distances of 1 m between positions at 1 s update intervals, then suddenly shows a single value 1 km away before returning near the original sequence of positions. From this we can infer that the "1 km" data point is not consistent with the remainder of the data, and can therefore be ignored in determining the evolution of the metric of interest. Other examples of data that would not pass such a self-consistency analysis include magnetometer values outside those that are valid for the local geomagnetic field, and spikes in otherwise smooth or unchanging barometer data that do not coincide with spikes in acceleration data that would suggest an actual altitude variation.

The analysis of the first and/or second data may comprise comparing said data with each other and/or the motion model. For example, this analysis may comprise determining at least one data point of the first and second data that does not correspond to the motion model, and correcting for said at least one data point. Suppose that the motion model (the motion model will be explained in more detail below) is that for a running user ("running"), and that on an analysis of the first and/or second data, a spurious data point is highlighted that does not correspond to such a motion—for example a data point that would suggest the sensor moved a distance in a time frame that would be inconsistent with someone who was running—such an erroneous data point can be corrected for (e.g. removed) in order to obtain the evolution of the metric of interest with improved accuracy. Such an analysis aids in avoiding spurious results that are a common problem in GNSS systems for example.

When comparing data, it is particularly beneficial to use data from at least three sensors in order to break the tie between measurements from any two sensors that may disagree. For example, data from a third sensor mounted on the first, second or a third platform, and obtained in a third time period, may be compared with data from first and second sensors obtained in first and second time periods. The third time period may wholly or partially overlap with the first and/or second time periods.

Limitations of Markovian methods using "single epoch" approaches that compare instantaneous data points are overcome by the techniques introduced herein which use multiple time periods in order to process multiple sensor data streams. In preferred embodiments these time periods allow analysis of the obtained data to provide further advantages over the state-of-the-art methods.

Particularly advantageously, the durations and/or amount of overlap of the first and second time periods with respect to each other are chosen so as to allow for optimal analysing of the first and/or second data. In general, the durations of the first and second time periods are determined based on at least one of the sampling frequency of the respective sensor, the required statistical confidence of the obtained data, and the amount of data required to identify any erroneous results. For example, in order to determine whether a platform is static or not, a time period is required in which to obtain the data necessary to make such a determination. A hundred measurements may be required in order to get a clear measure of the standard deviation of the statistics of the obtained data, therefore requiring a time duration of 100/fs, where fs is the sampling frequency of the respective sensor. As a further example, if the data is obtained from a GNSS sensor and we wish to identify and remove spurious data points (such as a GNSS data point that moves 1 km in 1 s and then back again), a rolling window of 5-10 data points may only be required. This assumes a relatively smooth motion of the platform of interest. Suppose a GNSS sensor providing a time-series of measurements of position experiences interference for a short period during which the data are identified as corrupted. In a conventional GNSS system, the trace of position would similarly be corrupted as the data would be analysed point by point in time order without reference to future data points. Advantageously, the analysis of the data allows the corrupted data to be ignored and only data obtained before and after the corrupted time period to be used to interpolate a trace during the corrupted period. Alternatively, after identifying the corrupted data, the time periods may be dynamically adjusted and the first time period chosen to be before the corrupted data, and the second time period chosen to be after the corrupted data, and the position between the two time periods interpolated to obtain a trace that was much more likely to be correct, using the obtained data from the first and second time periods.

In general, the obtained data are assessed on timescales that are appropriate to the sensor being used or the metric of interest. In some embodiments, the parameters (e.g. length and relative overlap) of the first and second time periods are chosen so as to allow for the identification and correction of at least one error in the first and/or second data.

In this way data from multiple sensors may be analysed over bespoke time periods, optimised for said analyses, and ultimately combined with a motion model to determine the evolution of a metric of interest between first and second time instances. The determination of the metric's evolution may use various sensor data from times in the past, and/or present, and/or future relative to at least one of the first and second time instances, and may involve processing of the data forwards and/or backwards in time, or as a batch, as will be explained further herein.

Importantly, the inventors have realised that there is not always the necessity for real-time information about the metric of interest (such as positioning) to be provided to a user. For example, in personal fitness tracking applications where the metric of interest is at least one of velocity and position, a user may benefit from increased accuracy of determining these metrics in order to improve their evaluation of the fitness session. Such evaluation may typically be performed after the session has taken place, and so real-time information may not be required.

If the evolution of the metric of interest is not required in real-time, then improved performance may be advantageously achieved by analysing at least one of the first and second data backwards in time. For example, if the same spurious data point is identified on an analysis of the data forwards and backwards in time, then that data point may be ignored or corrected on future passes through the data set.

Analysing the data backwards in time also advantageously allows asymmetries in the obtained data to be used in order to assess and/or correct the reliability and/or accuracy of the data. For example, an error "event" in the obtained data from a sensor may show up as a gradual change when analysed in the forwards direction (and therefore would not necessarily appear to be erroneous), but may show up as an implausible discontinuous jump when analysed in the backwards direction. Therefore, by analysing the data backwards in time, the obtained data may be corrected accordingly (for example by removing the data points making up the event). In preferred embodiments, the analysis of the first and/or second data backwards in time allows for erroneous data to be removed from subsequent passes of the data and determinations of the metric of interest, providing a significant improvement over a simple averaging of the forwards and backwards data.

In particularly beneficial embodiments, the first and/or second data are iteratively analysed forwards and/or backwards in time. Preferably, a first analysis of the first and/or second data is based on at least one confidence threshold and the at least one confidence threshold is modified after the first analysis; wherein a subsequent analysis of said first and/or second data is based on the modified confidence threshold. In other words, for such iterative analysis, at least two passes (analyses) are made through the first data and/or the second data, and confidence threshold(s) may be modified after each pass. The modification may be based on the results of the first analysis. For example, on a first pass the data may be analysed with a first confidence threshold that may not filter out any data. On subsequent passes of the data, some data from particular time periods may be excluded (or assigned greater uncertainty) when a tighter confidence threshold is used. Confidence thresholds that are changed on subsequent passes through the data advantageously allow the gradual removal of erroneous measurements that only become evident as erroneous through multiple passes through the data.

Confidence thresholds may be set initially ("predetermined") according to the known statistical noise properties of the sensors, or from information derived from other sensors, where information from a first sensor may be used to determine threshold(s) appropriate for testing the validity of measurements from a second sensor. For example, an inertial sensor providing acceleration information may be used to set thresholds on the expected variation in GNSS frequency measurements during dynamic motions. Here, changes in position may be deduced from measurements of acceleration, from which limits in the acceptable changes in position deduced from a GNSS or other position sensor may be set.

On a subsequent pass through the data, confidence in the information from other sensors may be improved, for example the biases associated with an inertial sensor may be known more accurately, leading to improved estimates of acceleration and hence tighter bounds on any GNSS frequency variations. A glitch or error in frequency measurement that was allowed during the first pass might now be removed on the second pass. Iterative analysis of the data also advantageously allows any biases in the first and/or second sensor to be determined more reliably.

In cases where it is not necessary to calculate the evolution of the metric of interest in or near real-time, a batch process might be used, using a least-squares or other estimator. For example, the first and/or second sensor may be providing data at a rate of 50 samples per second, but for a human user moving within a building the altitude estimate might only be required at a rate of 0.5 samples per second, and an additional lag of a few seconds may be satisfactory if the benefit is smooth and accurate estimates of altitude changes as the user traverses different floors of the building. In this example therefore, it is better to calculate altitude by batch processing information from a variety of data streams (which may have been subject to analyses themselves) every few seconds, rather than using live data immediately at a 50 per second rate as would typically be the case in state-of-the-art methods.

A particular advantage of analysing the first and/or second data forwards and backwards in time, or in a batch process, is that the trajectory of a device comprising the first and/or second sensor (e.g. a smart phone) during a journey may be accurately determined. Over the course of a journey, accurate positioning data meeting a predetermined confidence threshold may be obtained during certain time periods, but the data between these time periods may not meet the threshold. By analysing data from the first and/or second sensor obtained during the low-confidence time periods, and comparing possible trajectories in the low-confidence time periods with those in the bounding high-confidence time periods, the trajectory that best aligns with the high-confidence time periods can be used to determine the full trajectory of the journey. This could be done, for example, by determining a plurality of possible position contexts of the motion model (explained below) during the low-confidence time periods and choosing which of those results in a trajectory that best corresponds with the end points of the high-confidence time periods. In other embodiments, system and/or motion model parameters, such as IMU biases, step length models or direction-of-motion offsets, may be determined during the high-confidence time periods, enabling the sensor data in combination with the motion model to provide a positioning solution across the low-confidence time periods. In yet further embodiments, the sensor measurements in the low-confidence time periods may be constrained using prior information obtained, for example, from a map to aid the determination of the most likely trajectory, or by generating a least-squares fit of the entire trajectory (or piecewise fitting of sections of the trajectory) using the data from the high-confidence time periods as a means of constraining the fitting.

As described above, the inventors have advantageously realised that in many applications real-time determination of the evolution of a metric of interest is not required, and therefore have devised a means for providing a more accurate determination of the evolution of a metric of interest by using the obtained first and second data, and a motion model, in order to constrain the determination. However, in some embodiments, near real-time determination of the evolution of the metric of interest can be obtained if the first and/or second time period does not substantially extend into the future with respect to the second time instance. Here, near real-time results can be provided, which are continuously corrected and updated as more data is obtained to provide a more-accurate determination of the evolution of the metric of interest for subsequent analysis.

The motion model represents the general motion of the first and/or second platform. Typically the motion model comprises at least one of a motion context component comprising a motion context of the first platform and/or second platform, and a position context component comprising a position context of the first platform and/or second platform. The motion context represents the modality of motion, described, for example as "stationary", "walking", "running", "crawling", "ascending/descending stairs", "in a car", "on a bike" etc. The position context is the context in which the first and/or second platform is being supported, and generally comprises the attitude of the first and/or second platform (i.e. at least one of pitch, yaw and roll) with respect to its direction of motion. For example, first and second sensors may both be mounted on a common smart phone platform, in which case the position context may be that the phone is in a user's pocket, in a user's hand, strapped to a user's arm during exercise, or by the user's ear during a phone call.

In some embodiments, the motion model comprises at least one parameter that quantitatively describes an aspect of the motion, and/or at least one function that may be used to determine a parameter that quantitatively describes an aspect of the motion. For example, the at least one parameter may be one of: a pedestrian step length, a pedestrian speed, a pedestrian height, a pedestrian leg length, a stair rise, a stair run, or a compass-heading to direction-of-motion offset. The at least one function may be a function determining a pedestrian step length such as, for example, when a user's step length is parameterised as function of stepping cadence or speed. Other examples of parameters and functions are possible, as would be obvious to one skilled in the art.

Typically the motion model comprises one or more components, for example a motion context component, a position context component and/or a parameter component as explained above. In some embodiments, at least one parameter of the motion model is manually defined by a user. For example, a user may specify a walking motion model consisting of a pedestrian step length of 0.8 metres and constant compass-heading to direction-of-motion offset of 0 degrees (i.e. the position context).

Alternatively or in addition, at least one parameter of the motion model may be determined automatically from an analysis of the first and/or second data. In some embodiments, at least one parameter of the motion model is automatically determined from an analysis of data obtained from the first and/or second sensor during at least one previous determination of the evolution of a metric of interest over time. Typically, such a previous determination of the evolution of a metric of interest may be referred to as a previous 'journey'.

Motion model parameters may be automatically generated using sensor data from one or more journeys. In a preferred embodiment, the motion model is a parameterized model that is a function of one or more of the sensor measurements, or derivatives thereof. As discussed above for example, a user's step length may be parameterized as a function of stepping cadence. The coefficients of the best-fitting parametric model may be generated automatically, with step detections (and ultimately stepping cadence) derived from accelerometer sensor data, and distance travelled derived from GNSS sensor measurements. During periods of poor or no GNSS coverage, the trained motion model may be used to provide a good estimate of step length (and hence distance travelled) from a measurement of stepping cadence.

In embodiments, the at least one parameter and/or function of a given motion model is stored in an addressable storage indexed by at least one of the motion context, the position context or an identity of the first and/or second platform.

The motion model of the first and/or second platforms may be a pre-selected motion model. In such a case, a user may select a motion model that may represent the motion of the first and/or second platform, typically for the duration of the first and second time periods, but generally at least for the period of time between the first and second time instances (i.e. during which the evolution of the metric of interest is determined). For example, a user may use the techniques introduced herein to determine his or her route and speed during a run. In such a case, before commencing the run, the user would choose a motion model that represented "running".

In a preferred embodiment, the motion model is an automatically-selected motion model. The motion model may be automatically selected by determining at least one of the motion context and position context between the first and second time instances through analyses of the data obtained by the first and/or second sensors during the first and/or second time periods, and/or during the time period between the first and second time instances. For example, the data may be collected from an accelerometer sensor and a gyroscope sensor, and an analysis of those measurements used to determine the current motion and/or position context. A position context may last many minutes, yet may only take a matter of seconds to be changed (e.g. moving from a user's pocket to a user's ear). Therefore, the duration of a time period for attempting to determine a position context or change in position context may be of the order of 1-10 s. A corresponding motion model with predetermined parameters appropriate for the current user and sensor/platform combination may then be selected automatically, typically from data stored in addressable storage.

For example, at least one of an identity of the first and/or second platform, the determined motion context or the determined position context, may be used to recall from addressable storage at least one motion model parameter and/or function indexed using at least one of an identity of the first and/or second platform, a motion context and a position context.

If it is found that no motion model parameter and/or function is stored in addressable storage, the method may further comprise determining at least one motion model parameter and/or function for the motion model and storing said at least one motion model parameter and/or function in addressable storage, indexed using at least one of an identity of the first and/or second platform, a motion context and a position context.

Typically, the constraining of the evolution of the metric of interest comprises determining a measurement bias of the first sensor and/or second sensor and correcting for said bias.

This is particularly advantageous when low-cost sensors are used that are prone to such biases. Suppose that the motion model is "running", in which it is known that the velocity of each of the user's feet is zero at regular intervals when it is on the ground. If an inertial sensor is located on a user's foot, a zero velocity update analysis can be used to determine a bias of the inertial sensor during each stationary period. This bias measurement can be used to constrain the evolution of the metric of interest by taking the determined sensor bias into account, so as to improve the accuracy of the determination of the metric of interest.

The second data may be obtained from a second sensor mounted on the first platform. For example, the first and second sensors may be both mounted within a smart phone or a smart watch, or within a vehicle. In other embodiments the second data is obtained from a second sensor mounted on a second, different, platform. In one example, a GNSS sensor is mounted in a watch worn by a user, and an inertial sensor is mounted on the foot of the user. The combination of the data received from the GNSS sensor and inertial sensor may be used, together with a motion model, to constrain, and hence improve the accuracy of, an estimate of the route travelled by the user. Typically, where sensors are mounted on separate first and second platforms, the first and second platforms have at least one component of motion in common.

Furthermore, typically the first and second platforms are mounted on the same body of interest (e.g. a human user), and the evolution of the metric of interest is determined for the body of interest. In other embodiments the second platform may not be mounted on the same body of interest. For example, the sensors of the second platform may be providing differential corrections to the sensors of the first platform, such as differential GNSS corrections, or local barometric pressure measurements.

Typically, the first and second time periods at least partially overlap, although this is not essential and indeed the first and second time periods may not overlap.

As has been discussed above, in advantageous embodiments, at least one of the first and second time periods extends into the future with respect to the second time instance. If at least one of the first and/or second time periods extends into the future with respect to the second time instance (i.e. the endpoint of the evolution of the metric of interest), a more accurate determination of the evolution of the metric of interest can be made as the constraining can be performed with improved confidence because of the availability of information spanning the past, present and future of the time period of interest. Where both past and future information is available, interpolated constraints may be derived that are of higher confidence than the extrapolated constraints derived when only past information is available, such as in state-of-the-art systems. Furthermore, in embodiments where the motion model is determined from the first and/or second data, having the first and/or second time period extending into the future with respect to the second time instance advantageously allows for an improved motion model to be determined.

Typically, the second time period is longer than the first time period. This allows data from the past and/or the future with respect to the first time period to be used to optimally constrain the determination of the evolution of the metric of interest between the first and second time instances. The evolution of the metric of interest may be determined by calculating a solution for the metric of interest at a number of time instances between the first and second time instances, and constraining these solutions by the first and second data and the motion model.

In some embodiments the second time period may extend so as to encompass all of the data obtained from the first and/or second sensor. For example, if the first and/or second sensor is part of a pedestrian navigation system, the second time period may span multiple journeys undertaken by a user of the navigation system. Analysis of the second data over this long time period can enable information to be inferred about the user such as step length, gait characteristics, height, leg length, predicted motion contexts and position contexts. Furthermore, information about the first and/or second sensors themselves may be inferred, for example biases and noise characteristics. Advantageously, such a second time period encompassing a large amount of data results in better accuracy of a motion model (in the case where it isn't predetermined), thereby providing a more accurate determination of the metric of interest. Furthermore, such an embodiment may allow for automatic user identification (for example when a shared device is used by two or more users).

In some embodiments, the first sensor has a faster data sampling rate than the second sensor.

The first sensor may comprise one of an accelerometer, a gyroscope, a magnetometer, a barometer, a GNSS unit, a radio frequency (RF) receiver (e.g. using WiFi, BlueTooth, cellular telephony, digital television/radio), a pedometer, a light sensor, a camera, a pressure sensor, a strain sensor, a proximity sensor, a RADAR and a LIDAR. Other sensor types may be added to this list, as would occur to one skilled in the art. In some embodiments the first sensor is an inertial measurement unit and may be a part of an inertial navigation system.

The second sensor may comprise one of an accelerometer, a gyroscope, a magnetometer, a barometer, a GNSS unit, a radio frequency (RF) receiver e.g. using WiFi, BlueTooth, cellular telephony, digital television/radio), a pedometer, a light sensor, a camera, a pressure sensor, a strain sensor, a proximity sensor, a RADAR and a LIDAR. Other sensor types may be added to this list, as would occur to one skilled in the art. In some embodiments the second sensor is an inertial measurement unit and may be a part of an inertial navigation system.

In preferred embodiments, the method may further comprise obtaining, in a third time period, third data from at least one of the first sensor, a second sensor and a third sensor; and wherein the determination of the evolution of the metric of interest is further constrained by the third data. The third sensor may be positioned on the first or second platform, or a third platform. Analysis of the third data may be performed in the same way as described above for the first and second data.

Additionally, disclosed herein is a computer readable medium comprising executable instructions that when executed by a computer cause the computer to perform the method of the techniques disclosed herein.

The computer readable medium may be provided at a download server. Thus, the executable instructions may be acquired by the computer by way of a software upgrade.

Further disclosed herein is a system comprising: at least one sensor making measurements from which position or movement may be determined, in order to determine the evolution of a metric of interest, and; a processor adapted to perform the steps of: obtaining, in a first time period, first data from a first sensor mounted on a first platform; obtaining, in a second time period, second data from said first sensor and/or a second sensor mounted on the first platform or a second platform, and; determining the evolution of a metric of interest between first and second time instances, wherein at least one of the first and second time instances is within at least one of the first and second time periods, wherein; the evolution of the metric of interest is constrained by the first data, second data and a motion model of the first and/or second platform.

Although the method and system according to the techniques introduced herein may be used to combine data from any sensors to determine the evolution of a metric of interest, the techniques have particular application in the field of navigation systems, where the metric of interest is navigation data such as a position and/or velocity. In this context, the techniques have numerous advantages over methods used in the state of the art. For example, because of the constraints provided by the first data, second data and the motion model, the techniques introduced herein can provide an accurate, high time-resolution, pedestrian navigation solution using low-cost, smart phone-grade inertial measurement units, with no requirement for GNSS data. Not only does this mean that satellite coverage is not required, but it also takes advantage of the fact that the update rates for IMUs are typically much faster than for GNSS units (of the order 100 Hz for an IMU as opposed to typically 1 Hz for GPS) enabling high time-resolution traces of the sensor-platform's trajectory. Furthermore, the innovative combination of data in the techniques introduced herein means that accurate navigation information may be obtained from widely available low-cost MEMS IMUs, whereas using conventional methods such devices may only provide a reliable navigation solution for a few seconds when GNSS data are unavailable.

BRIEF DESCRIPTION OF THE DRAWINGS

Examples of the present techniques introduced herein will now be described with reference to the attached drawings, in which.

DETAILED DESCRIPTION

Figure 1:
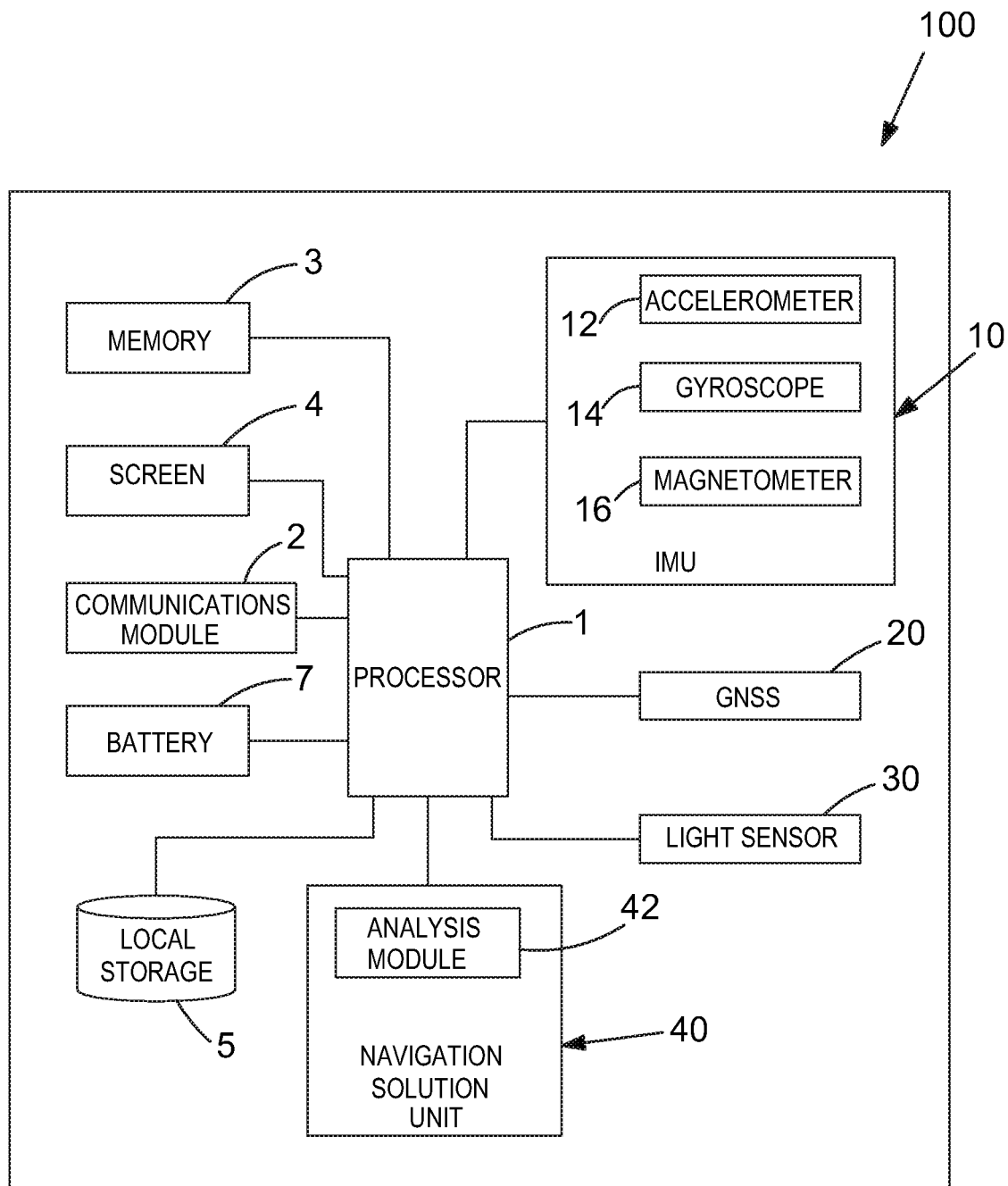
FIG. 1 is a schematic logical diagram of a portable device that may implement the techniques introduced herein.

FIG. 1 is a schematic logical diagram of a portable device 100 that may implement the techniques introduced herein. In this example, the portable device 100 is a smart phone, but it will be appreciated that the techniques introduced herein may be implemented on a range of devices such as wearable devices (e.g. smart watches and other jewellery), tablets, laptop computers etc.

FIG. 1 shows the relevant components of the smart phone 100, which includes a processor 1, communications module 2, memory 3, screen 4, local storage 5 (non-volatile memory) and a battery 7. The communications module 2 comprises components necessary for wireless communication, such as a receiver, transmitter, antenna, local oscillator and signal processor.

The device 100 also comprises an inertial measurement unit (IMU) 10, which here includes an accelerometer 12, a gyroscope 14 and a magnetometer 16. The accelerometer is configured to measure the acceleration of the device; the gyroscope is configured to measure the rotation rate of the device, and the magnetometer is configured to measure the strength and direction of the local magnetic field, and hence the compass heading of the device 100. The accelerometer, gyroscope and magnetometer may be MEMs devices, which are typically tri-axial devices, where each orthogonal axis comprises a separate sensor. Other inertial sensors may be included in such an IMU.

The device 100 further comprises a GNSS sensor 20, such as a GPS or GLONASS sensor (or both), and a light sensor 30. In other embodiments, other sensors may be used, examples of which have been discussed above.

Each of the communications module 2, memory 3, screen 4, local storage 5, battery 7, IMU 10, GNSS sensor 20 and light sensor 30 is in logical communication with the processor 1. The processor 1 is also in logical communication with Navigation Solution Unit (NSU) 40, which is operable to obtain data from the device sensors and determine from said data, amongst other metrics, the position and velocity of the device. For simplicity, in the following description, the evolution of the metric of interest is the position of the device 100, i.e. its trajectory over time.

The NSU 40 may be implemented in hardware, firmware, software, or a combination thereof.

Figure 2:
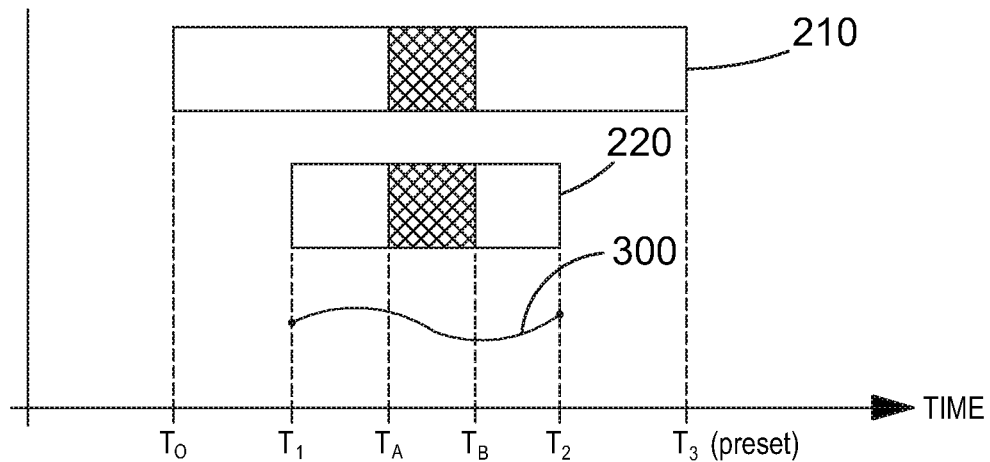
FIG. 2 schematically represents data that has been obtained by sensors in first and second time periods.

Conventionally, if it is desired to track the evolution of a device's position between two time instances $T_1$ and $T_2$, as schematically illustrated in FIG. 2, a solution may be provided by performing, at each time instance in the time interval $T_1$ to $T_2$, single integration of the data from the rate gyroscope 14 to determine device attitude and double integration (while correcting for gravity) of the data obtained from the accelerometer sensor 12 in order to obtain position data. However, as has been discussed above and as is well known in the art, such solutions based on consumer-grade inertial sensors are typically subject to large accumulated attitude and position errors after only a matter of seconds due to the numerical integration of measurements from noisy and often poorly calibrated sensors. Similarly, although GNSS sensors may provide accurate position data when the device has a clear line of sight to the satellite constellation, position data from such sensors is subject to large errors (or may not be available at all) when no direct line of sight is available, such as when the user is inside a building or travelling through an "urban canyon".

FIG. 2 schematically illustrates how the techniques introduced herein overcome these problems in order to provide an accurate and reliable trajectory of the device between the time instances $T_1$ and $T_2$.

Box 210 in FIG. 2 schematically represents data obtained by the sensors of the IMU 10, GNSS sensor 20 and light sensor 30 over the time period between $T_0$ (for example when the user turned the smart phone on in the morning) to time $T_3$, which in the current example is the present time. For the purposes of this discussion, this time period between $T_0$ and $T_3$ will be referred to as the second time period 210.

Similarly, box 220 schematically represents data obtained by the sensors of the IMU 10, GNSS sensor 20 and light sensor 30 over the time period between $T_1$ and $T_2$ which, for the purposes of this discussion, will be referred to as the first time period. In this example, the evolution of the metric of interest (position) is being measured between time instances $T_1$ and $T_2$ corresponding to the first time period, although this is not necessarily the case. For example, the evolution of the position may be desired to be determined between the time instances $T_0$ and $T_2$.

The data obtained in the first time period (the first data) and the data obtained in the second time period (the second data) are provided to the NSU 40 which calculates the desired solution, in this case the trajectory of the device between time instances $T_1$ and $T_2$. The solution is constrained by both the first data and the second data, and a motion model of the device between time instances $T_1$ and $T_2$.

The motion model represents the general motion of the device, and preferably comprises three components: a position context, a motion context and at least one parameter that quantitatively represents the motion of the device. The position context is the context in which the smart phone is being supported, and may comprise the attitude of the device, for example a heading to direction-of-motion offset. More generally, this can be used to infer the mode in which the device is being carried, which in the case of a smart phone may be in a pocket, beside the ear, in the user's hand swinging by his side, being held in front of the user's face etc. The motion context may generally describe the mode by which the user of the smart phone (and hence the smart phone itself) is moving, for example walking, running, crawling, cycling etc. Finally, the at least one parameter quantitatively describes an aspect of the motion, for example, a step length or speed of the user.

As the solution is constrained by the first data, second data and the motion model, this means that erroneous data obtained from the sensors may be corrected for in providing the position solution. For example, if the motion model comprises a motion context of "walking" and a position context of "in a user's pocket", then any data obtained by, say, the GNSS sensor that does not align with the motion model (for example a spurious data event that would not be possible by walking, such as a sudden and large change in position) can be corrected for or removed when providing the position solution.

The motion model may be pre-selected by a user of the smart phone, for example through interaction with an appropriate graphical user interface (GUI) presented to the user via screen 4. At time $T_1$ for example, the user may decide to go for a run, and select a motion model that comprises a motion context of "running". When determining the evolution of the smart phone's position between the time instances $T_1$ and $T_2$, the solution provided by the NSU 40 is constrained by the first data, second data and the "running" motion model.

Alternatively, the first and/or second data may be used to automatically select, by an analysis module 42 of the NSU 40, a motion model for use in generating the position solution. The second data may be analysed by the analysis module 42, and the data from the accelerometer and gyroscope sensors used to determine a current motion and/or position context. The accelerometer 12 may determine a step cadence of the user and determine that the motion context is "walking", and furthermore that the step length of the user is 0.8 m. In addition to data obtained from the gyroscope sensor 14 that may be used to determine a position context, the light sensor 30 may detect minimal or no light during the time period between $T_0$ and $T_3$, and it can therefore be inferred that the smart phone is in an enclosed space such as a pocket or a bag if the time is during daylight hours. Therefore, the second time period can be thought of as providing a context under which the data from the first time period is processed to provide the location solution. The first data may also be used to select a motion model automatically.

In particularly advantageous embodiments, the techniques introduced herein take advantage of the fact that a user of a portable device such as a smart phone 100 is likely to make numerous such journeys. Therefore, the motion model parameters for a particular user and device/sensor combination may be automatically learned by machine learning algorithms and refined over a plurality of such journeys spanning a wide range of motion and position contexts. For example, it may be determined that after a plurality of journeys, a reliable step length for the user of a smart phone is 0.75 m rather than the initially-determined 0.8 m, thereby providing more accurate navigation solutions. The motion models and their various parameters may be stored in the local storage 5 on the device, or by other addressable storage means (e.g. through use of a client-server system), and indexed by position context and/or motion context. Subsequently, a stored motion model and its corresponding parameters may be automatically selected from the addressable storage when a particular motion and/or position context is determined.

A user may use more than one device, for example a smart phone and a wearable device such as a smart watch. In other embodiments the motion model and associated parameters may be further indexed by device and/or user, such that, in general, a motion model appropriate for a device and its current user may be selected automatically.

In preferred embodiments, the data obtained during the first 220 and second 210 time periods is analysed by the analysis module 42 of the NSU 40 during the determination of the device trajectory between time instances $T_1$ and $T_2$. Such analysis advantageously allows for the assessment of the reliability and accuracy of the data obtained during the first and second time periods, in order to provide improved navigation solutions as compared to state-of-the-art systems that instead rely on instantaneous estimates. As seen in FIG. 2 for example, the second time instance $T_2$ is in fact in the past with respect to the present time, which here is $T_3$. Instantaneous position data is not always required, and indeed in many cases users of a device would be willing to forego instantaneous results for more accurate position data. The time lag between $T_2$ and $T_3$ may be of the order of 1 s, or longer.

Such analysis as performed by the analysis module 42 may comprise self-consistency analysis (analysing the data obtained by a sensor across the respective time period) and cross-reference analysis, where the data from one sensor is compared with the data from another sensor and/or the motion model. The analysis performed by the analysis module may comprise analysing the obtained data forward and/or backwards in time, or as a batch process.

Take, for example, a situation where the motion model is "walking", but on analysis of the data obtained from the GNSS sensor, a data event is observed that does not fit with such a walking motion model (e.g. a sudden shift in position by 50 m). This data event can be flagged as unreliable and hence not used in the final position solution provided by the NSU 40.

Figure 3:
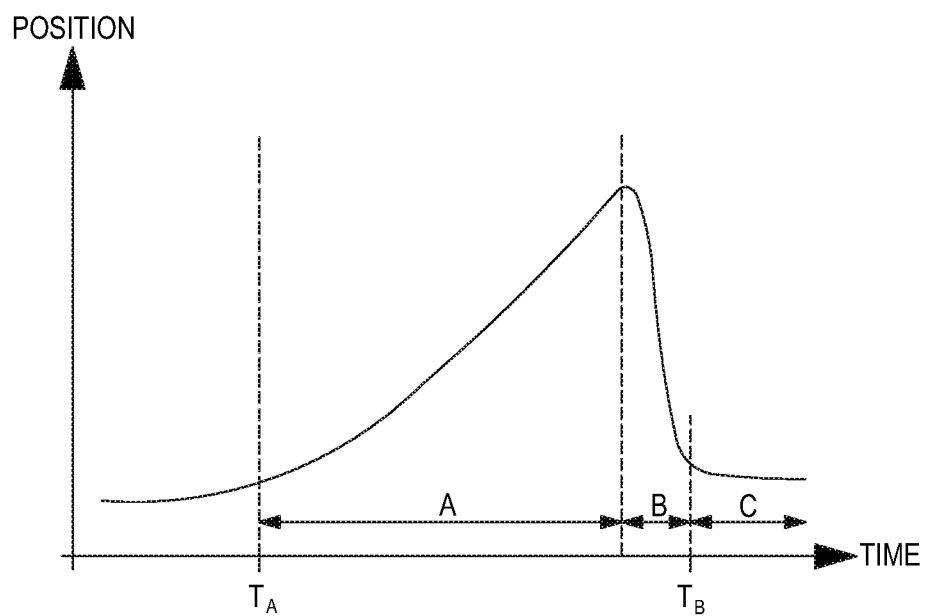
FIG. 3 schematically illustrates example position data obtained by a GNSS sensor between two time instances.

The analysis performed by the analysis module 42 may comprise processing the obtained data forwards and backwards in time, which allows any asymmetries in them to be used in determining their reliability and accuracy. FIG. 3 schematically illustrates one-dimensional position data obtained by the GNSS sensor 20. In this example the plotted change in position between the time instances $T_A$ and $T_B$ is caused by erroneous position data. When processing the data forwards in time, the gradual change in position over the time period A may initially be seen as a possible "allowed" motion of the device (the allowed motions being constrained, for example, by the current motion model and/or measurements from the IMU). In such circumstances the erroneous GNSS position data from time period A is used to generate the navigation solution. The rapid change in position over time period B falls outside the allowed range of motion of the device, indicating there is a potential problem with the GNSS position data.

However, with just the forward-in-time processing it is unclear whether the data before or after time instance $T_B$ is in error. In a naïve system that only uses forwards-in-time analysis some or all of the "accurate" position data after time instance $T_B$ (illustrated here at "C") may be rejected, as these are now inconsistent with the navigation solution that has been corrupted by the erroneous data from time period A. In extreme cases the system might never recover the true navigation solution. By applying backwards-in-time processing to the same data (i.e. from $T_B$ to $T_A$), the almost discontinuous jump in position over the time period B is detected as being inconsistent with the allowed motion of the device, and consequently the position data is ignored (or assigned lower confidence) when combining data to obtain the navigation solution. This continues until such times as the position data is deemed consistent with the current navigation solution and the "allowed" motion of the device from the motion model. For example, in FIG. 3 all or most of the erroneous position data between times $T_B$ to $T_A$ would be correctly ignored (or given lower confidence) by the NSU 40 during backwards-in-time processing.

The analysis may comprise iteratively processing the obtained data forward and/or backwards in time. For example, confidence thresholds applied to an initial pass of the data may be such that all of the obtained data is allowed to be used for the navigation solution provided by the NSU 40. Of course, these data may include erroneous results such as the GNSS data obtained between time instance $T_A$ and $T_B$ depicted in FIG. 3; however, it is important not to lose data that may represent the actual motion taken by the device. On subsequent passes of the data, those from particular time periods (such as between $T_A$ and $T_B$) may not meet a new confidence threshold determined after the first pass, and are therefore ignored or corrected for. The benefit of processing data backwards in time rather than just using multiple passes forwards in time is that the uncertainty on any derived parameters increases over time in the absence of measurements. Therefore parameters can be better estimated overall in regions such as between $T_A$ and $T_B$ by processing the data either side of that region in both directions and combining the estimates provided by these two passes via a weighted mean or similar calculation.

Confidence thresholds may be set initially according to the known statistical noise properties of the device sensors, or from information derived from other sensors. For example, the accelerometer 12 may provide acceleration information in order to set thresholds on the expected variation in the GNSS frequency measurements during dynamic motions. On a subsequent pass through the data, the biases on the accelerometer may be known more accurately (for example, zero velocity update analysis may be performed during an initial analysis which reveals bias information). This means that the acceleration data is more accurate and reliable and therefore the confidence threshold on the expected frequency variation can be tighter (i.e. smaller variation). As a result, any error in frequency measurement that was allowed during the first pass of the data may now be ignored on the second pass due to the tighter (more confident) confidence thresholds.

Referring back to FIG. 3, as discussed above, on the first pass of the data, the initial confidence thresholds may be such that the GNSS data obtained between time instances $T_A$ and $T_B$ are seen as being consistent with the "allowed" motion of the device from the motion model. During the course of the first-pass processing, better estimates of the IMU 10 biases are determined, which can be used on subsequent passes of the data to provide more accurate IMU data and, consequently, tighter confidence thresholds for other sensor data. For example, on a subsequent pass, the GNSS position data between time instances $T_A$ and $T_B$ might now be found to be inconsistent with the more tightly constrained allowed motion of the device, and, as a result, be filtered out of (or assigned lower confidence in) the final trajectory solution.

Confidence thresholds and the related analyses forwards and backwards in time may be applied to sensor data as described, and also to derived data and metrics of interest, including platform states, pose, and derived or latent variables such as sensor biases and calibration parameters.

In FIG. 2, the second time period 210 is illustrated as extending between time instance $T_0$ and $T_3$, and the first time period 220 as extending between $T_1$ and $T_2$. Advantageously, the durations of the first and second time periods are chosen so as to allow for optimal assessment by the analysis module 42 of the reliability and accuracy of the data obtained from the device sensors. Furthermore, in some embodiments, the durations of the first and/or second time periods may be dynamically changed in response to the assessment by the analysis module. For example, the second time period may be extended because of the erroneous data between time periods $T_A$ and $T_B$, such that the extended time period allows for a more reliable interpretation of the data (for example so as to automatically select a motion model).

Figure 4:
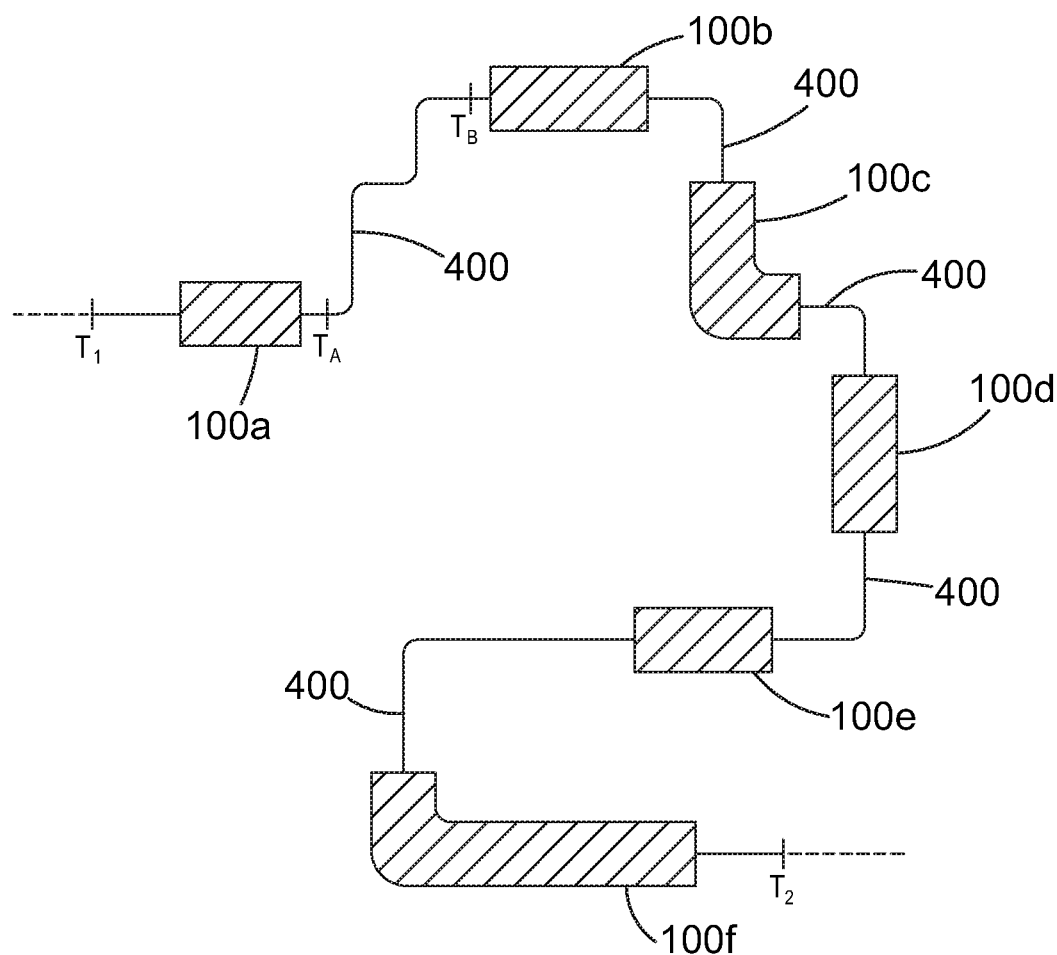
FIG. 4 schematically illustrates the evolution of the position of a smart phone as determined between time instances.

FIG. 4 schematically illustrates the evolution of the position of the smart phone 100 as determined between time instances $T_1$ and $T_2$. The hatched boxes 100a, 100b, 100c, 100d, 100e, 100f represent time periods in which the absolute position of the device 100 has been determined with high confidence ("confident sections"), for example because of the availability of high quality GNSS data. The orientations of the confident sections also indicate the orientation of the device (e.g. position context) at that time period. The line 400 between the confident sections illustrates the potential trajectory of the device (i.e. the evolution of its position) as determined by the NSU 40. The time instances $T_A$ and $T_B$ are illustratively shown as a time period where the GNSS data were deemed to be too unreliable for determining the absolute position of the device, as has been explained above in relation to FIG. 3. Other metrics may be used to invoke the rejection (or reduction in confidence) of GNSS data, for example the number of satellites in use being fewer than a predetermined number, the signal strength of the GNSS data being below a predetermined threshold etc.

Typically, when the GNSS data are analysed, if an event that is deemed to be unreliable is found (such as region B in FIG. 3), then the GNSS data may be deemed unreliable for a certain time period before and after the "flagged" event, as the error in the data from the GNSS sensor may increase gradually rather than abruptly. For example, again referring to FIG. 3, the GNSS trace would be flagged as unreliable from time instant $T_A$ rather than from the start of time period $T_B$.

In order to determine the trajectory of the device between the confident sections, the data obtained in the confident sections are analysed and used to determine biases in the accelerometer 12, gyroscope 14 and magnetometer 16 sensors, calculate step length parameters of the motion model, and determine the direction-of-motion to heading offset, such that the data obtained from the IMU sensors, together with the motion model, may be used to determine the trajectory of the device accurately and reliably between the confident hatched regions.

Alternatively or in addition, data obtained from the accelerometer 12, gyroscope 14 and magnetometer 16 during the time periods between the confident sections may be used in combination with multiple estimates of one or more parameters to determine a plurality of possible trajectories, and the trajectory that best aligns with the confident sections may be used. For example, a plurality of direction-of-motion to heading-offset estimates may be used to generate trial trajectories during the low-confidence time periods, with the optimal trajectory being chosen as that which best aligns with the end-points of the trajectory in the high-confidence time periods. The trajectory between the confident sections (as well as the data and system parameters contributing to its construction) may also be constrained using prior information obtained from a map to help determine which of the plurality of trajectories is the most likely. For example, if one of the possible trajectories involved crossing a river where no bridge was located, that particular trajectory could be ruled out; or if the map data indicates that a pedestrian would most likely travel along a straight path while the navigation solution shows a curved trajectory, this could be used to identify and correct a yaw-axis gyroscope bias.

In further embodiments, a least-squares fit of the entire trajectory (or piecewise fitting of sections of the trajectory) constrained by the data from the confident sections may be carried out.

As is schematically seen in FIG. 2, the second time period may extend into the future with respect to the first time period (and the second time instant $T_2$). In other words, when determining the evolution of a metric of interest between two time instances $T_1$ and $T_2$, data from the future with respect to $T_2$ is used to constrain the solution. This provides a more accurate determination of the evolution of the metric of interest, as constraints may be interpolated for future time periods with respect to the second time instance $T_2$, rather than simply extrapolated. In other words, the extension of the second time period into the future with respect to the second time instance $T_2$ allows for a more accurate context, or "overall picture" of the data from which the evolution of the metric of interest is to be determined.

Figure 5:
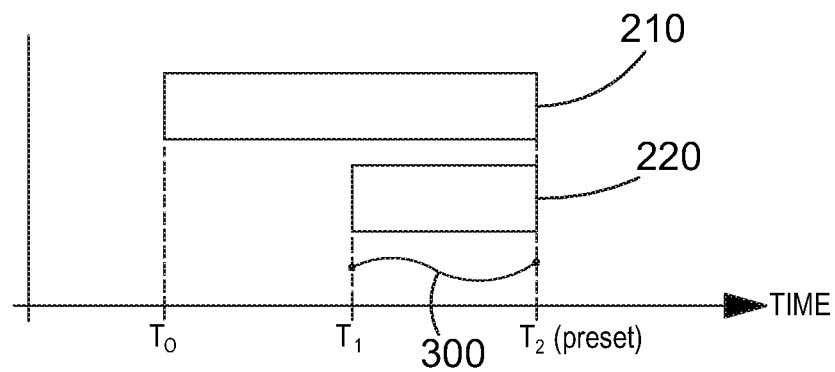
FIG. 5 schematically represents data that has been obtained over first and second time periods.

However, there are some situations, for example navigation, where real-time information is demanded by a user of such a device. In these cases, the second time instance $T_2$ may be at, or within a small interval behind, present time, as schematically illustrated in FIG. 5. The relative positions of the second time period 210 and first time period 220 are also shown, with both time periods ending at time $T_2$ and only extending into the past with respect to $T_2$.

Therefore, the trajectory of the device may be provided to the user in near-real-time, with the solution for the present time only constrained by past data. However, advantageously, position solutions for previous times may be continually updated as new data are obtained. For example, at time instance $T_2$, both the first and second time periods extend into the future with respect to and therefore at $T_2$, a more accurate and reliable position of the device at $T_1$ may be determined as compared to the solution determined within the small interval behind at the time instance $T_1$ itself. In this manner, the techniques introduced herein provide for near-real-time determination of the evolution of a metric of interest, as well as an improved determination of said evolution over time as more data are obtained.

Figure 6:
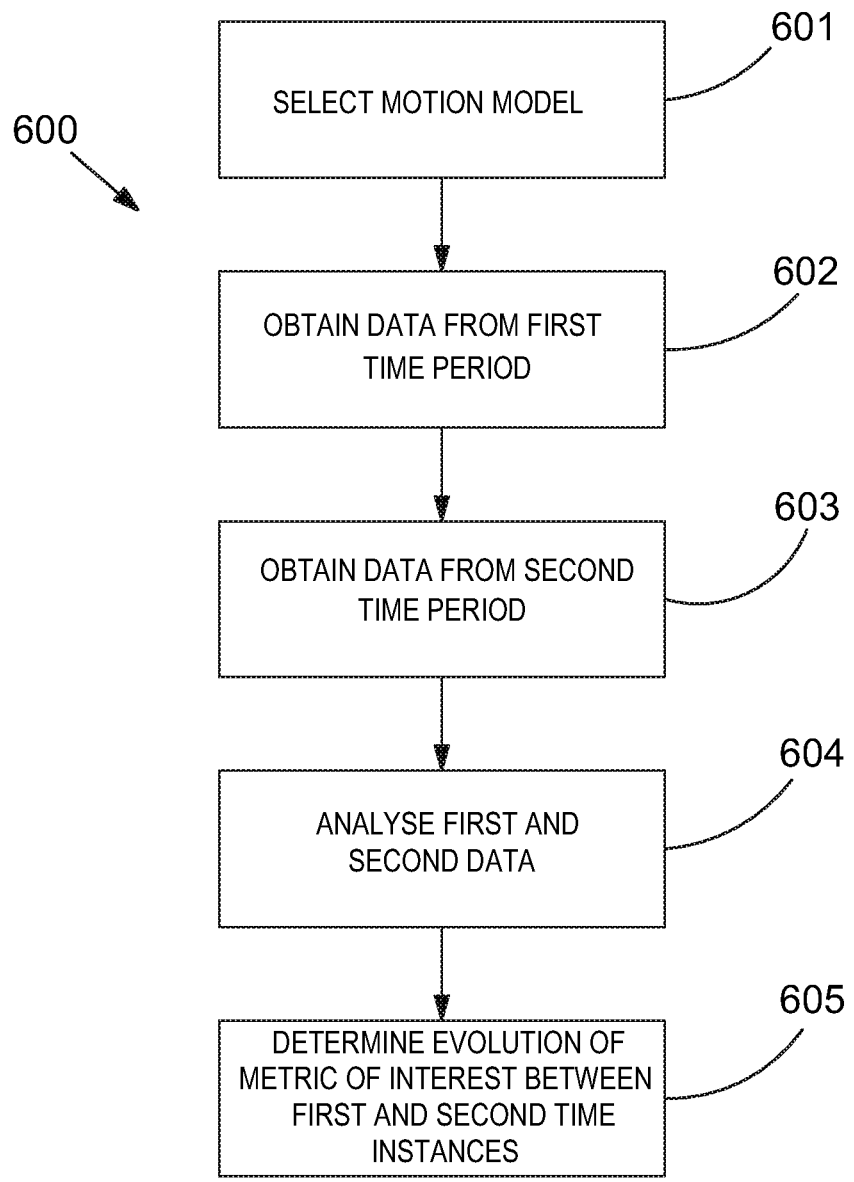
FIG. 6 is a flow diagram outlining the main steps of one embodiment of the techniques introduced herein.

FIG. 6 is a flow diagram 600 outlining the main steps of one embodiment of the techniques introduced herein. At step 601, a user of the device preselects a motion model, typically by interaction with a suitable GUI via a screen of the device. As discussed above, a motion model may comprise a motion context, a position context and at least one quantitative parameter describing the motion. At step 601, the user may pre-select at least one of these components. For example, the user may simply select a motion model having a motion context of "running".

At step 602, the NSU 40 obtains data from the first time period, and at step 603 obtains data from the second time period. Although these are set out in method 600 as separate steps, it will be appreciated that the NSU 40 may obtain the data from the first and second time periods substantially simultaneously. In other embodiments the data from the second time period may be obtained before the data from the first time period.

At step 604, the first and second data are analysed by the analysis module 42, as described above, and at step 605, the NSU 40 determines the evolution of the metric of interest between first and second time instances. In the series of steps set out in method 600, the motion model is shown as being pre-selected before the obtaining of data. However, it will be appreciated that the motion model may be selected by the user after the obtaining of the data.

Figure 7:
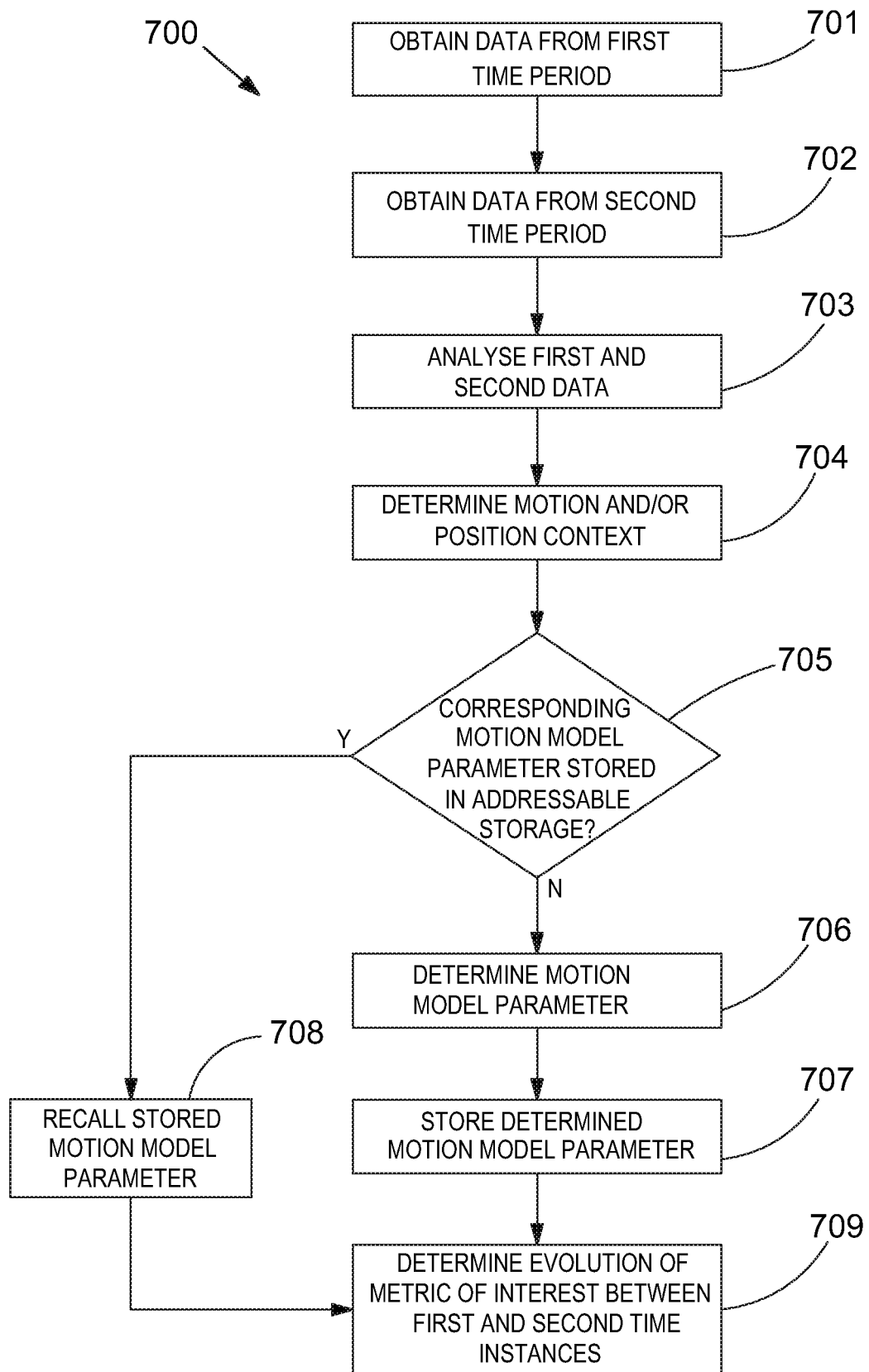
FIG. 7 is a flow diagram outlining the main steps of a further embodiment of the techniques introduced herein.

FIG. 7 is a flow diagram 700 outlining the main steps of a further embodiment of the techniques introduced herein, in this case where the motion model is automatically selected from analysis of the first and second data. At step 701, the NSU 40 obtains data from the first time period, and at step 702 obtains data from the second time period. In the same manner as described above in relation to FIG. 6, steps 701 and 702 may in some cases occur substantially simultaneously or in reverse order.

At step 703 the first and second data are analysed by the analysis module 42.

At step 704, from the analysis performed at step 703, the motion and/or position context of the device is determined.

At decision step 705, it is determined whether or not a motion model parameter that corresponds to the current user, device, and the position and/or motion context that was determined in step 704, is stored in addressable storage (for example local storage 5). If such a motion model does exist, this is recalled (step 708) and at step 709 the NSU 40 determines the evolution of the metric of interest between the first and second time instances, with the evolution constrained by the first data, second data and the motion model including the at least one parameter recalled from local storage. The quantitative motion model parameter may comprise an estimate of the step length of the user for example. As has been discussed above, advantageously such a parameter may have been refined during previous analyses of data obtained by the device for the user.

If, at step 705, it is determined that no corresponding motion model parameter exists, then the method moves to optional step 706 where the determined motion and/or position context is used to determine at least one parameter associated with the motion of the device. Optionally, this may be stored in addressable storage (step 707), indexed by the determined motion and/or position context and the identity of the device. Subsequently, at step 709 the NSU 40 determines the evolution of the metric of interest between time instances $T_1$ and $T_2$, with the evolution constrained by the first data, second data and motion model.

Figure 8:
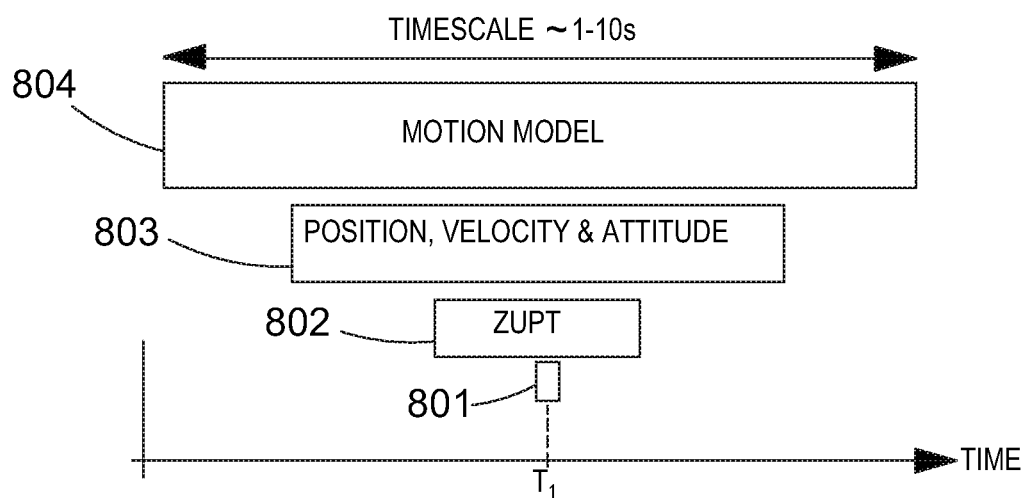
FIG. 8 is a schematic overview of how data from at least one sensor may be used to determine the evolution of a metric of interest.

FIG. 8 is a schematic overview of how data from at least one sensor may be used to determine a navigation solution, for example for the smart phone 100 described above. Box 801 schematically represents the navigation solution generated by the NSU 40, at time instance $T_1$, which here is at, or within a small interval behind, the present time. The navigation solution of the NSU is based on data from the IMU, the sensors of which may have sampling rates in the region of ~100-1000 samples per second, and so the time period of box 801 may be of the order of ~1-10 ms. In conventional solutions, this "instantaneous" data obtained from an IMU would simply be used to output the navigation solution for that instant in time, and would therefore be subject to large error drift.

As schematically shown in FIG. 8, the techniques introduced herein may utilize data obtained from past and future time periods with respect to the NSU/IMU time instance $T_1$ in order to constrain the navigation solution at that time instance. Information from any of the boxes 801 to 804 may be analysed intra- and inter-box using a variety of methods in order to optimally filter and combine all of the available data, thus resulting in an improved navigation solution. In this example, box 802, labelled "ZUPT", represents data obtained by the IMU, and which has been analysed to determine whether or not the IMU was stationary at time instances during the time interval represented by box 802. Periods of detected zero velocity may be used, for example, to reset the velocity measurement being tracked by the NSU, or to determine biases in the inertial sensors of the IMU which may then be used to constrain the NSU solution at time instance $T_1$.

Box 803 may represent data obtained from a GNSS sensor that can be used to provide position and velocity data to further constrain the NSU solution. Additionally, information from box 802 may be used to filter out GNSS data in box 803 that is in violation of a confidently determined zero velocity condition. Attitude data may be obtained from an accelerometer and/or a gyroscope and/or magnetometer sensor.

A motion model schematically illustrated at box 804 may have been pre-selected or automatically determined (for example through analysis of the raw IMU data, or from the position, velocity and attitude data). The motion model may include one or more parametric models describing some aspect of the user's motion. Analyses of sensor data contained in one or more of the boxes 801 to 804 may be performed to extract values subsequently used as input to such parametric models. For example, stepping cadence may be extracted from accelerometer data, and subsequently input to a function modelling pedestrian step length. As has been described above, the motion model at box 804 may be used to aid filtering of input sensor data and constrain the navigation solution.

FIG. 8 illustrates boxes 802, 803 and 804 as having different sizes (i.e. time periods), but this does not necessarily have to be the case and is for the purposes of illustration only. However, advantageously, the data obtained and used to constrain the NSU solution at time instance $T_1$ have been obtained over longer time periods, and extend into both the past and future, with respect to time instance $T_1$. The evolution of the metric of interest (here positioning data determined from the NSU) may be determined between first and second time instances by combining the positioning solution obtained at a plurality of such time instances.

As will be appreciated, the diagram of FIG. 8 is for illustrative purposes only, and the boxes may represent different sensor data streams and analyses.

The main example used in the detailed description has been that of a smart phone, where the measurement sensors are all positioned on a common platform (i.e. the smart phone itself). However, in other embodiments, data from sensors positioned on two (or more) platforms may be used in order to determine the evolution of a metric of interest. For example, in some embodiments, a first platform may be a smart phone carried by a user and the second platform may be a smart watch worn by the user. In other words, both platforms here can be thought of as freely-moving sensor sets that provide independent measurements about the user. By determining the evolution of a metric of interest for both platforms (e.g. position data for both the smart phone and smart watch), the evolution of that metric of interest can be reliably inferred for the user (i.e. the trajectory of the user). Furthermore, on analysis of the sensor data, comparisons between the data obtained on the different platforms may be performed. For example, data obtained from an inertial sensor of the smart watch may be cross-referenced with data obtained from a GNSS sensor of the smart phone.

In another example, a vehicle has sensors mounted onto its chassis (the first platform) which measure the vehicle's acceleration and rate-of-turning. The driver carries a smartphone in his pocket (the second platform) which has a built-in GNSS receiver, as well as sensors measuring acceleration, rate of turning etc. Data obtained from all of these sensors are analysed together using the methods outlined above to determine the trajectory of the driver's pocket and/or the vehicle with the lowest uncertainty.

The invention claimed is:

1. A system comprising:
   at least one sensor, mounted on a platform, configured to make measurements from which platform position or platform movement may be determined, in order to determine an evolution of platform position; and
   a processor adapted to perform, for each of a plurality of time instances, the steps of:
   obtaining, in a first time period, first data from at least one sensor mounted on the platform, where the at least one sensor makes measurements from which platform position or movement is determined;
   obtaining, in a second time period, second data from the at least one sensor mounted on the platform;
   comparing the first and second data to each other and to a motion model representing expected motion of the platform over at least a part of the respective first and second time periods to obtain corrected first data and corrected second data; and
   determining the evolution of the position of the platform, where the evolution is constrained by at least one of the corrected first data and corrected second data.

2. The system of claim 1, wherein the at least one sensor comprises at least one of: an accelerometer, a gyroscope, a magnetometer, a barometer, a GNSS unit, a radio frequency receiver, a pedometer, a camera, a light sensor, a pressure sensor, a strain sensor, a proximity sensor, a RADAR, and a LIDAR.

3. The system of claim 1, wherein the platform is an electronic user device.

4. The system of claim 3, wherein the electronic user device is a smart phone or a wearable device.

5. A method of determining an evolution of position of a platform over time as the platform is being transported on a vehicle or a human user, comprising:
obtaining, in a first time period, first data from at least one sensor mounted on the platform, where the at least one sensor makes measurements from which platform position or platform movement is determined;
obtaining, in a second time period, second data from the at least one sensor mounted on the platform;
comparing the first and second data to each other and to a motion model representing expected motion of the platform over at least a part of the respective first and second time periods to obtain corrected first data and corrected second data; and
determining the evolution of the position of the platform, where the evolution is constrained by at least one of the corrected first data and corrected second data.

6. The method of claim 5, further comprising analyzing the first and second data over at least a part of the respective first and second time periods in order to assess the reliability and/or accuracy of the first and second data.

7. The method of claim 6, wherein analyzing the first and second data comprises performing self-consistency checks on the data across the corresponding time period.

8. The method of claim 6, wherein the duration of the first time period, the second time period and/or their amount of overlap relative to each other and the respective time instance is dynamically adjusted in response to the assessed reliability and/or accuracy of the associated sensor data.

9. The method of claim 5, wherein the first data and/or second data are iteratively analyzed forwards and/or backwards in time.

10. The method of claim 9, wherein a first analysis of the first and/or second data is based on at least one confidence threshold and the at least one confidence threshold is modified after the first analysis; wherein a subsequent analysis of said first and/or second data is based on the modified confidence threshold.

11. The method of claim 5, wherein the motion model comprises at least one of a motion context component comprising a motion context of the platform, and a position context component comprising a position context of the platform.

12. The method of claim 5, wherein the motion model comprises at least one parameter that quantitatively describes an aspect of the motion, and/or at least one function that may be used to determine a parameter that quantitatively describes an aspect of the motion.

13. The method of claim 12, wherein the at least one parameter is one of: a pedestrian step length, a pedestrian speed, a pedestrian height, a pedestrian leg length, a stair rise, a stair run or a compass-heading to direction-of-motion offset.

14. The method of claim 12, wherein the at least one function is a function determining the pedestrian step length or speed.

15. The method of claim 5, wherein at least one component of the motion model is automatically determined from an analysis of the first and/or second data, or wherein at least one component of the motion model is automatically determined from an analysis of data obtained from the at least one sensor during at least one previous determination of an evolution of platform position.

16. The method of claim 5, wherein the constraining of the evolution comprises determining a measurement bias of the at least one sensor and correcting for said bias.

17. The method of claim 5, wherein at least one of the first and second time periods extends into the future with respect to a present time instance in which the evolution is being determined.

18. The method of claim 5, wherein the at least one sensor comprises at least one of: an accelerometer, a gyroscope, a magnetometer, a barometer, a GNSS unit, a radio frequency receiver, a pedometer, a camera, a light sensor, a pressure sensor, a strain sensor, a proximity sensor, a RADAR, and a LIDAR.

19. The method of claim 5, wherein the platform comprises an electronic user device.

20. The method of claim 5 wherein the at least one sensor used to obtain the first data is different from the at least one sensor used to obtain the second data.

* * * * *